Figure 1:
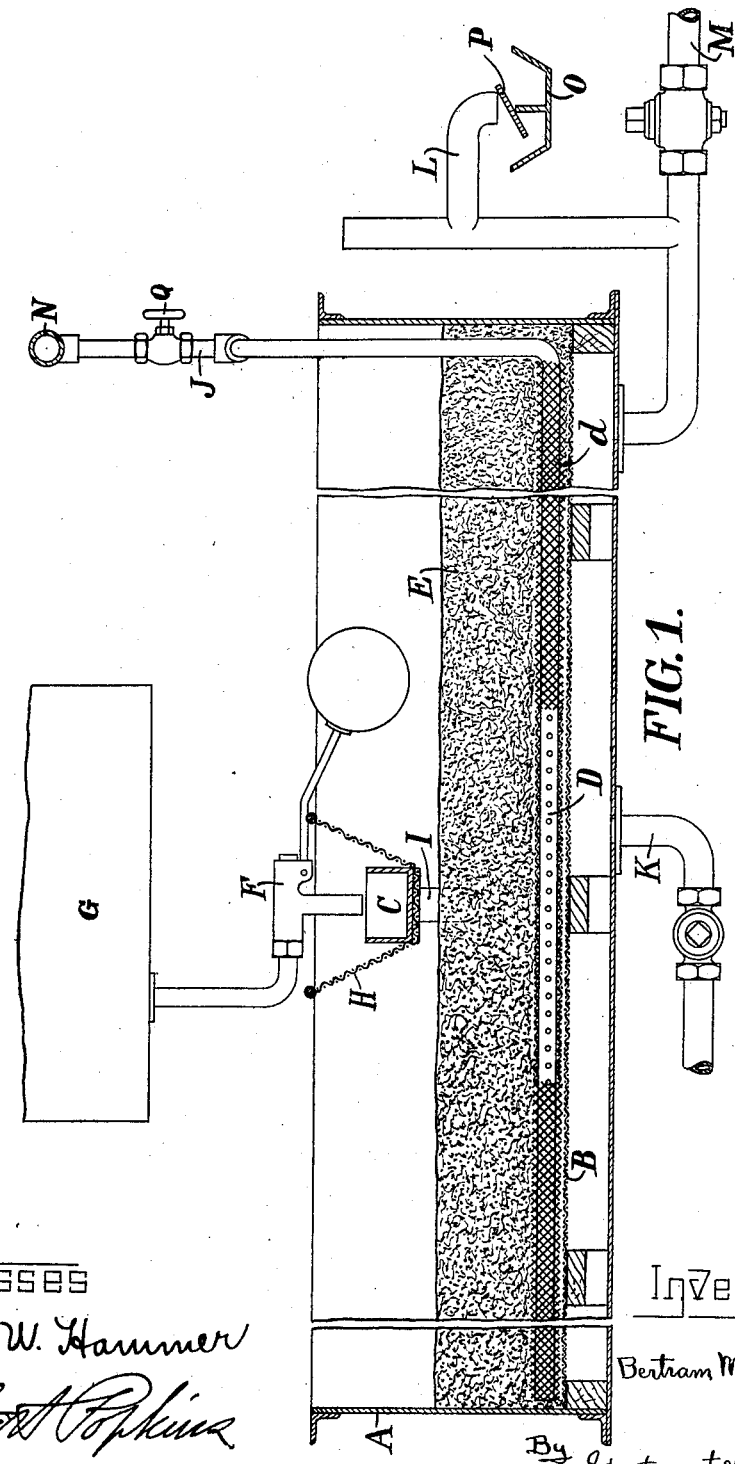

No. 897,745. PATENTED SEPT. 1, 1908.
B. M. JÄGER.
FILTERING APPARATUS.
APPLICATION FILED JAN. 3, 1908.

2 SHEETS—SHEET 1.

Witnesses
Mary W. Hammer
Albert Popkins

Inventor
Bertram Maurice Jäger
By Sturtevant & Mason

No. 897,745. PATENTED SEPT. 1, 1908.
B. M. JÄGER.
FILTERING APPARATUS.
APPLICATION FILED JAN. 3, 1908.
2 SHEETS—SHEET 2.
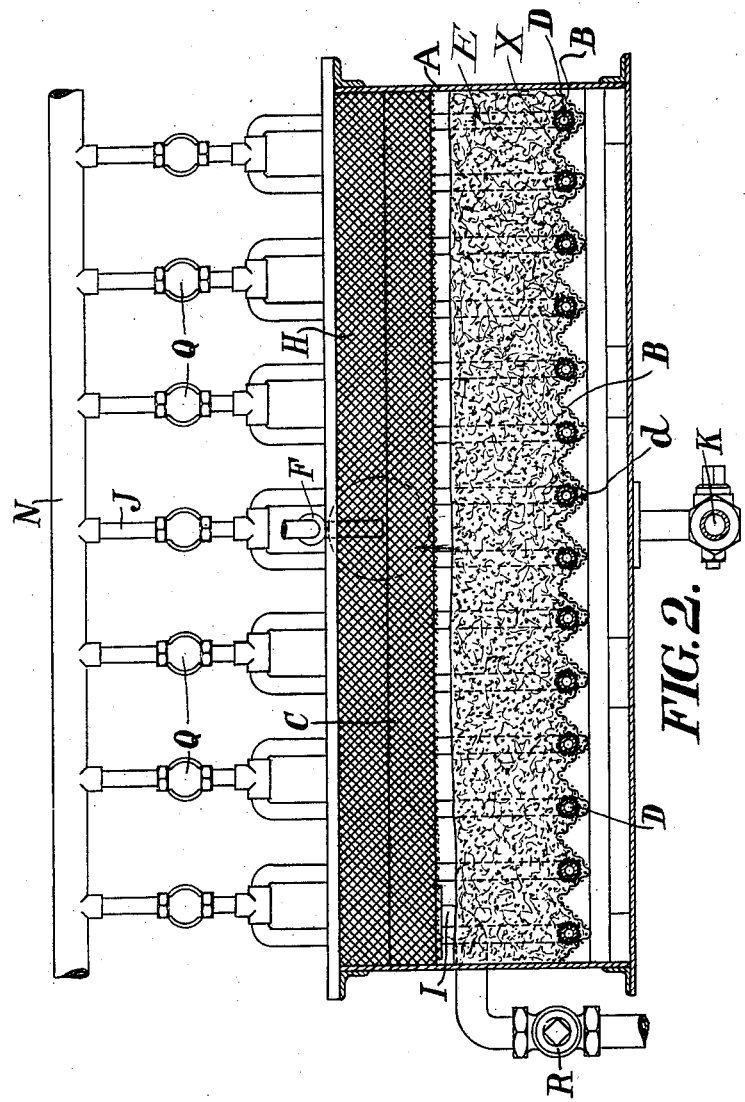
Witnesses
Mary W. Hammer
Albert Popkins
Inventor
Bertram Maurice Jäger
By
Sturtevant & Mason

UNITED STATES PATENT OFFICE.

BERTRAM MAURICE JÄGER, OF BIRKENHEAD, ENGLAND.

FILTERING APPARATUS.

No. 897,745.          Specification of Letters Patent.          Patented Sept. 1, 1908.

Application filed January 3, 1908. Serial No. 409,123.

*To all whom it may concern:*

Be it known that I, BERTRAM MAURICE JÄGER, subject of the King of Great Britain, residing at Birkenhead, in the county of Chester, in the Kingdom of England, sugar-refiner, have invented certain new and useful Improvements in Filtering Apparatus, for which application has been made in Great Britain, No. 20,677, dated September 17, 1907.

This invention has for its object an arrangement of apparatus more especially for the sand filter type, whereby the filtering material can be rapidly cleansed.

The invention will be understood from the following description, reference being had to the accompanying drawings in which:—

Figure 1 is a vertical section through the apparatus; Fig. 2, a cross section.

A is a tank for the liquor to be filtered, with a false bottom B of gauze. This tank A has arranged across it, preferably about two inches above the top of the sand, a trough C for retaining heavy sediment, also distributing the liquor the full length or width of the tank A. Just above the gauze B, and about seven or eight inches apart, I place perforated steam pipes D, extending from end to end of the tank A. Above these are 7 or 8 inches of coarse sand E.

F is the ball control tap for delivering liquor into the filtering apparatus from the supply tank G. H a wire gauze protection on the outside of the trough C for retaining pieces of wood, rag or other material, and when used for cleaning, to keep sand out of the trough C.

I is an opening in the bottom of the trough C leading to the drain. J a steam pipe arranged in couples one over each section, K inlet for wash water, L outlet for filtered syrup, M outlet for emptying the tank, N main steam pipe, O a double trough with liquor switch P for switching liquid onto either side of the partition of the said trough.

In filtering the syrup, after a time the filter ceases to operate through scum closing the pores. I then pass water through the pipe K up through the filter, and at the same time put on the steam through each of the cross pipes D in succession, there being cocks Q to regulate this. Nearly the whole of the water gushes above the steam pipes D that are in operation, cleans out all scum from the sand E and passes through the gauze H into the trough C, which has hitherto been used to carry and distribute syrup to be filtered, and which is now connected with the drain by opening valve R in the drain pipe I, and as the water falls over its edge it carries scum to the drain. The wire gauze H prevents sand being carried into the trough C, so that while scum can pass through the gauze, the sand cannot, but falls back again into the filtering tank A. The object of making the wire gauze bottom B corrugated, is that I have found when a flat bottom was used between the steam pipes D, there was a sort of ridge of dirty sand left, and so in order to avoid this, I make the wire gauze bottom B corrugated, sloping down to each of the steam pipes, that is with the steam pipes in the concavities of the corrugations. In this way I can have a still finer gauze than heretofore, and yet have just as free a flow of liquid, and the corrugations between the two steam pipes will take the place of the ridge of unwashed sand which formerly existed, and if it be found that too much water comes up through the apices, owing to there being a little less depth of sand at this point, this can be corrected by having a double thickness of gauze at each apex, as shown at one apex marked X.

In thus describing my invention, I do not bind myself to the use of gauze as of course perforated metal can be used instead in many cases. Further this apparatus is applicable to filtering with sand, gravel, peat, spongy iron, and any well known fragmentary fibrous or granular filtering material, and any other fluid such as hot air could take the place of steam. The secret of success of the invention I think in great measure is, that the boiling which takes place above each steam pipe in succession thoroughly washes the sand. For some liquors, it is advisable to increase the depth of the sand E, for others to decrease it. For the majority of liquors to be filtered, however, the surface of the sand E or other medium is the place where most of the filtering takes place. In some gelatinous or clay-like or adhesive substances, I find it is not necessary to wash the filtering medium with water, as soon as the filter stops running freely, but I merely bubble hot air or steam through it from the pipes, in order to break up the deposits.

By corrugating the false bottom B it is much stronger and will carry a greater weight of sand etc. In order to prevent the sand entering the perforated pipes D I prefer to cover them with wire gauze d. The filter being fed by means of a ball tap F, no attention is required until it becomes necessary to thoroughly clean the filter, and then the ball tap is closed. Where the liquor to be filtered carries with it a heavy sediment like sand et cetera, the trough acts as a trap for the sediment, and for this purpose the trough C may be deepened if desired.

I declare that what I claim is:—

1. The improvements in filtering apparatus which consists in the combination of a filtering chamber having a false bottom, means for withdrawing filtered material through all parts of said false bottom, means for supplying material to be filtered to the upper part of the filter, a layer of granular material on the false bottom, means for passing a gaseous material under pressure such as steam up through the granular material at any given small portion of its surface from near the bottom of said granular material and thus thoroughly washing the granular material over a small portion of the area at a time, means for stopping the normal flow of the current through the filtering apparatus, and means for allowing the washings to overflow at the top.

2. In apparatus for filtering liquids, the combination of a filtering tank, a perforated false bottom thereto, a bed of granular material on said false bottom, means for passing steam up through the granular material in each small portion of the bed consecutively, and thus of thoroughly stirring and washing the granular material, means for reversing the current while this is going on and means whereby the liquid at its upper surface is allowed to overflow over a large area of lip and escape to the drain while the washing is going on.

3. In filters, the combination of a chamber having a perforated bottom, granular filtering material thereon, means immediately above that bottom for injecting air or steam over the various parts of the said bottom separately, and at the same time means for passing washing water up through the granular material, whereby while the material is being washed, it is also being thoroughly agitated by the air or steam.

4. In filters, the combination with a filtering tank of a pervious false bottom of metal, a layer of filtering medium thereon, and just above said foraminous surface, means for supplying a gaseous material such as steam or air through each portion of the piping consecutively, means for introducing wash water below the false bottom, means for shutting off admission of liquor above the granular material whereby during the reversal of current each separate portion of the granular material is thoroughly stirred and washed.

5. In filters, the combination with a filtering tank, of a corrugated pervious bottom therefor, and steam pipes in the concavities of the corrugations, whereby the area of said bottom is increased and strengthened, and finer gauze or perforations can be used than heretofore with equal flow of liquid, and whereby the formation of ridges of unwashed sand is avoided.

6. In filters in which scum is removed by reversing the current, the combination with a filtering tank of a central overflow trough which is adapted to retain sediment, a waste exit from the bottom of the trough, and wire gauze protection on the outside of the trough inclosing the same from its lip to above the surface of the water in the tank whereby pieces of wood, rag or other material are retained, and whereby during cleaning the filtering medium is kept from entering the trough, but wash water together with the scum and fine dirt from the filtering medium is allowed to pass into the trough and so to the drain.

7. In filters the combination with a filtering tank of a trough arranged across it, considerably above the bottom, into which liquor to be filtered flows, and which carries and distributes the liquor the full length or width of the tank, a pipe leading from said trough to the drain, and a cock in said pipe for closing it when the trough is used for carrying and distributing the liquor to be filtered, and means whereby wash water is caused to rise up through into the tank and fall into the trough.

In witness whereof, I have hereunto signed my name this 20th day of December 1907, in the presence of two subscribing witnesses.

BERTRAM MAURICE JÄGER.

Witnesses:
WM. P. THOMPSON,
RICHARD W. WILLIAMS.